United States Patent
Wang et al.

(10) Patent No.: US 12,045,061 B2
(45) Date of Patent: Jul. 23, 2024

(54) MULTI-AGV MOTION PLANNING METHOD, DEVICE AND SYSTEM

(71) Applicant: GOERTEK INC., Shandong (CN)

(72) Inventors: Xueqiang Wang, Shandong (CN); Yifan Zhang, Shandong (CN); Libing Zou, Shandong (CN); Fuqiang Zhang, Shandong (CN)

(73) Assignee: GOERTEK INC., Shandong (CN)

( * ) Notice: Subject to any disclaimer, the term of this patent is extended or adjusted under 35 U.S.C. 154(b) by 516 days.

(21) Appl. No.: 17/309,922

(22) PCT Filed: Sep. 10, 2020

(86) PCT No.: PCT/CN2020/114422
§ 371 (c)(1),
(2) Date: Jun. 30, 2021

(87) PCT Pub. No.: WO2022/007179
PCT Pub. Date: Jan. 13, 2022

(65) Prior Publication Data
US 2022/0317695 A1 Oct. 6, 2022

(30) Foreign Application Priority Data
Jul. 10, 2020 (CN) .......................... 202010663470.1

(51) Int. Cl.
*G05D 1/00* (2024.01)
*G06N 3/04* (2023.01)
(Continued)

(52) U.S. Cl.
CPC ......... *G05D 1/0221* (2013.01); *G05D 1/0088* (2013.01); *G05D 1/0214* (2013.01);
(Continued)

(58) Field of Classification Search
CPC .. G05D 1/0221; G05D 1/0088; G05D 1/0214; G05D 1/0289; G05D 1/0297;
(Continued)

(56) References Cited

U.S. PATENT DOCUMENTS

| 6,377,878 B1* | 4/2002 | Feddema ............. G05D 1/0221 |
| | | 701/532 |
| 11,243,532 B1* | 2/2022 | Levihn ..................... G06N 3/08 |

(Continued)

FOREIGN PATENT DOCUMENTS

| CN | 102929281 A | 2/2013 |
| CN | 107967513 A | 4/2018 |

(Continued)

*Primary Examiner* — Yazan A Soofi
*Assistant Examiner* — Naeem Taslim Alam
(74) *Attorney, Agent, or Firm* — LKGlobal | Lorenz & Kopf, LLP

(57) ABSTRACT

A multi-AGV motion planning method, device and system are disclosed. The method of the present disclosure comprises: establishing an object model through reinforcement learning; building a neural network model based on the object model, performing environment settings including AGV group deployment, and using the object model of the AGV in a set environment to train the neural network model until a stable neural network model is obtained; setting an action constraint rule; and after the motion planning is started, inputting the state of current AGV, states of other AGVs and permitted actions in a current environment into the neural network model after trained, obtaining the evaluation indexes of a motion planning result output by the neural network model, obtaining an action to be executed of the current AGV according to the evaluation indexes, and performing validity judgment on the action to be executed using the action constraint rule.

16 Claims, 5 Drawing Sheets

(51) Int. Cl.
*G06N 3/08* (2023.01)
*G06N 7/01* (2023.01)

(52) U.S. Cl.
CPC ......... *G05D 1/0289* (2013.01); *G05D 1/0297* (2013.01); *G06N 3/04* (2013.01); *G06N 3/08* (2013.01); *G06N 7/01* (2023.01)

(58) Field of Classification Search
CPC .... G05D 2201/0216; G06N 7/01; G06N 3/04; G06N 3/08
See application file for complete search history.

(56) References Cited

U.S. PATENT DOCUMENTS

| | | | | |
|---|---|---|---|---|
| 2002/0032528 | A1* | 3/2002 | Lai | G08G 5/0008 |
| | | | | 342/29 |
| 2011/0307175 | A1* | 12/2011 | Gandhi | G08G 1/166 |
| | | | | 701/301 |
| 2018/0208195 | A1* | 7/2018 | Hutcheson | G08G 1/162 |
| 2019/0169007 | A1* | 6/2019 | Standard | B66F 9/12 |
| 2019/0271988 | A1* | 9/2019 | High | G01C 21/3438 |
| 2020/0133273 | A1* | 4/2020 | Skorheim | G05D 1/0221 |
| 2020/0151564 | A1* | 5/2020 | Nakhaei Sarvedani | |
| | | | | G01S 17/86 |
| 2020/0160070 | A1* | 5/2020 | Sholingar | G06T 7/70 |
| 2020/0174459 | A1* | 6/2020 | Sasaki | G05B 19/41865 |
| 2020/0193460 | A1* | 6/2020 | Obara | G07C 5/08 |
| 2020/0269712 | A1* | 8/2020 | Kozlovsky | H02J 50/10 |
| 2020/0272159 | A1* | 8/2020 | Zhang | G08G 1/22 |
| 2021/0148716 | A1* | 5/2021 | Atanasiu | G06Q 10/047 |
| 2021/0256321 | A1* | 8/2021 | Gerardo | G06F 18/2411 |
| 2021/0341309 | A1* | 11/2021 | Yuan | G01C 21/3461 |
| 2022/0016778 | A1* | 1/2022 | Sinyavskiy | G01C 21/3453 |

FOREIGN PATENT DOCUMENTS

| | | |
|---|---|---|
| CN | 108600379 A | 9/2018 |
| CN | 109059931 A | 12/2018 |
| CN | 109540150 A | 3/2019 |
| CN | 110378439 A | 10/2019 |
| CN | 110471297 A | 11/2019 |
| CN | 110991545 A | 4/2020 |
| CN | 111061277 A | 4/2020 |
| CN | 111240356 A | 6/2020 |
| CN | 111260031 A | 6/2020 |
| CN | 111309035 A | 6/2020 |
| JP | 2014211667 A | 11/2014 |
| JP | 2019168763 A | 10/2019 |

* cited by examiner

MULTI-AGV MOTION PLANNING METHOD, DEVICE AND SYSTEM

CROSS-REFERENCE TO RELATED APPLICATION

This Application is a U.S. National-Stage entry under 35 U.S.C. § 371 based on International Application No. PCT/CN2020/114422, filed Sep. 10, 2020 which was published under PCT Article 21(2) and which claims priority to Chinese Application No. 202010663470.1, filed Jul. 10, 2020, which are all hereby incorporated herein in their entirety by reference.

TECHNICAL FIELD

This Application pertains to the field of computer technology, and in particular to a multi-AGV motion planning method, device and system.

BACKGROUND

In recent years, automated guided vehicles (AGV) have been increasingly widely used in intelligent manufacturing and logistics fields, which effectively improved the transportation efficiency in production, manufacturing and conveying stages, and reduced the human workload. Among them, the collaborative work of multiple AGVs can improve the efficiency of the AGV, but at the same time it will make the motion planning problem more complicated and difficult. Common path planning algorithms, such as A* algorithm and artificial potential field method, have problems such as high computational cost and liability to be involved in local minimum solutions when dealing with multiple AGV motion planning problems. In addition, other objects, desirable features and characteristics will become apparent from the subsequent summary and detailed description, and the appended claims, taken in conjunction with the accompanying drawings and this background.

SUMMARY

The present disclosure provides a multi-AGV motion planning method, device and system to solve or partially solve the above technical problems.

In an aspect, the embodiments of the present disclosure provide a multi-AGV motion planning method. The method comprises:
  establishing an object model for describing a sequence decision process of multi-AGV motion planning through a reinforcement learning method, wherein the object model includes: an AGV state, an action space, and evaluation indexes of a motion planning result, and the AGV state includes a state of current AGV, states of other AGVs calculated based on the state of current AGV, and permitted actions of a current AGV;
  building a neural network model based on the object model, performing environment settings including AGV group deployment, and using the object model of the AGV in a set environment to train the neural network model until a stable neural network model is obtained;
  setting an action constraint rule, and using the action constraint rule to perform validity judgment on an action to be executed of the current AGV obtained based on the evaluation indexes; and
  after the motion planning is started, inputting the state of current AGV, states of other AGVs and permitted actions in a current environment into the neural network model after trained, obtaining the evaluation indexes of a motion planning result output by the neural network model, obtaining an action to be executed of the current AGV according to the evaluation indexes, and performing validity judgment on the action to be executed using the action constraint rule, so that the current AGV executes a valid action according to a judgment result.

In another aspect, the embodiments of the present disclosure provide a multi-AGV motion planning device. The device comprises:
  a modeling unit for establishing an object model for describing a sequence decision process of multi-AGV motion planning through a reinforcement learning method, wherein the object model includes: an AGV state, an action space, and evaluation indexes of a motion planning result, and the AGV state includes a state of current AGV, states of other AGVs calculated based on the state of current AGV, and permitted actions of a current AGV;
  a training unit for building a neural network model based on the object model, performing environment settings including AGV group deployment, and using the object model of the AGV in a set environment to train the neural network model until a stable neural network model is obtained;
  a setting unit for setting an action constraint rule, and using the action constraint rule to perform validity judgment on an action to be executed of the current AGV obtained based on the evaluation indexes; and
  an implementation unit for, after the motion planning is started, inputting the state of current AGV, states of other AGVs and permitted actions in a current environment into the neural network model after trained, obtaining the evaluation indexes of a motion planning result output by the neural network model, obtaining an action to be executed of the current AGV according to the evaluation indexes, and performing validity judgment on the action to be executed using the action constraint rule, so that the current AGV executes a valid action according to a judgment result.

In yet another aspect, the embodiments of the present disclosure provide a multi-AGV motion planning system. The system comprises:
  a control center for deploying the multi-AGV motion planning device;
  an AGV group composed of multiple AGVs and deployed in an environment; and
  a task scheduling center platform;
  the AGVs in the AGV group use their own sensors to obtain their own states and upload them to the control center, and receive action instructions issued by the control center, and execute actions corresponding to the action instructions;
  the task scheduling center platform is configured to complete task planning and task dispatch and send a task of a certain AGV to the control center, and the control center controls the AGV to complete the task;
  the control center has a built-in stable neural network model, inputs a state of an AGV received into the neural network model, uses the neural network model to calculate a motion planning strategy of the AGV, and then generates action instructions according to the motion planning strategy and issues them to the AGV.

In a fourth aspect, the present disclosure provides an electronic apparatus comprising a memory and a processor. The memory stores computer executable instructions. When executed by the processor, the executable instructions cause the processor to perform the above multi-AGV motion planning method.

In a still further aspect, the present disclosure provides a computer readable storage medium. The computer readable storage medium stores one or more programs. The one or more programs, when executed, implement the above multi-AGV motion planning method.

The beneficial effects of the present disclosure are as follows. First, the embodiments of the present disclosure adopt a deep reinforcement learning method, take advantage of the merits of neural network models in computing high-dimensional state space and the characteristics of reinforcement learning online control, and thus improve the performance of the multi-AGV motion planning method in dynamic environments. Second, the embodiments of the present disclosure combine the optimal path search algorithm and the deep reinforcement learning algorithm, and constrain the learning direction of the deep reinforcement learning algorithm using the optimal path search algorithm, so that the AGV can plan a feasible route in a dense environment, and prevent the AGV from entering a local deadlock state.

BRIEF DESCRIPTION OF DRAWINGS

The present invention will hereinafter be described in conjunction with the following drawing figures, wherein like numerals denote like elements, and.

DETAILED DESCRIPTION

The following detailed description is merely exemplary in nature and is not intended to limit the invention or the application and uses of the invention. Furthermore, there is no intention to be bound by any theory presented in the preceding background of the invention or the following detailed description.

Herein the exemplary embodiments will be described in detail, examples of which are illustrated in the accompanying drawings. The following description refers to the accompanying drawings in which the same numerals in different drawings represent the same or similar elements unless otherwise indicated. The implementations described in the following exemplary embodiments do not represent all implementations consistent with the present disclosure. Instead, they are merely examples of apparatuses and methods consistent with aspects related to the present disclosure as recited in the appended claims.

At present, when the multi-AGV motion planning is performed in a dynamic dense environment, there are many problems to face such as an increase in search space and dynamic changes in the environment, and the difficulty will increase exponentially as the scale of the environment increases and the number of AGVs increases. Conventional motion planning algorithms have problems such as difficulty in solving and excessive computational cost. Moreover, in dense environments, the conventional methods are likely to cause the deadlock of AGV and cannot complete the motion planning well.

Based on the above description, the embodiments of the present disclosure aim to solve the problems in the multi-AGV motion planning in a dynamic environment based on the deep reinforcement learning method, and combine the deep reinforcement learning method with the optimal path search method to solve the problems in the multi-AGV motion planning in a dense environment, and thus complete the multi-AGV motion planning task in a dynamic dense environment.

Figure 1:
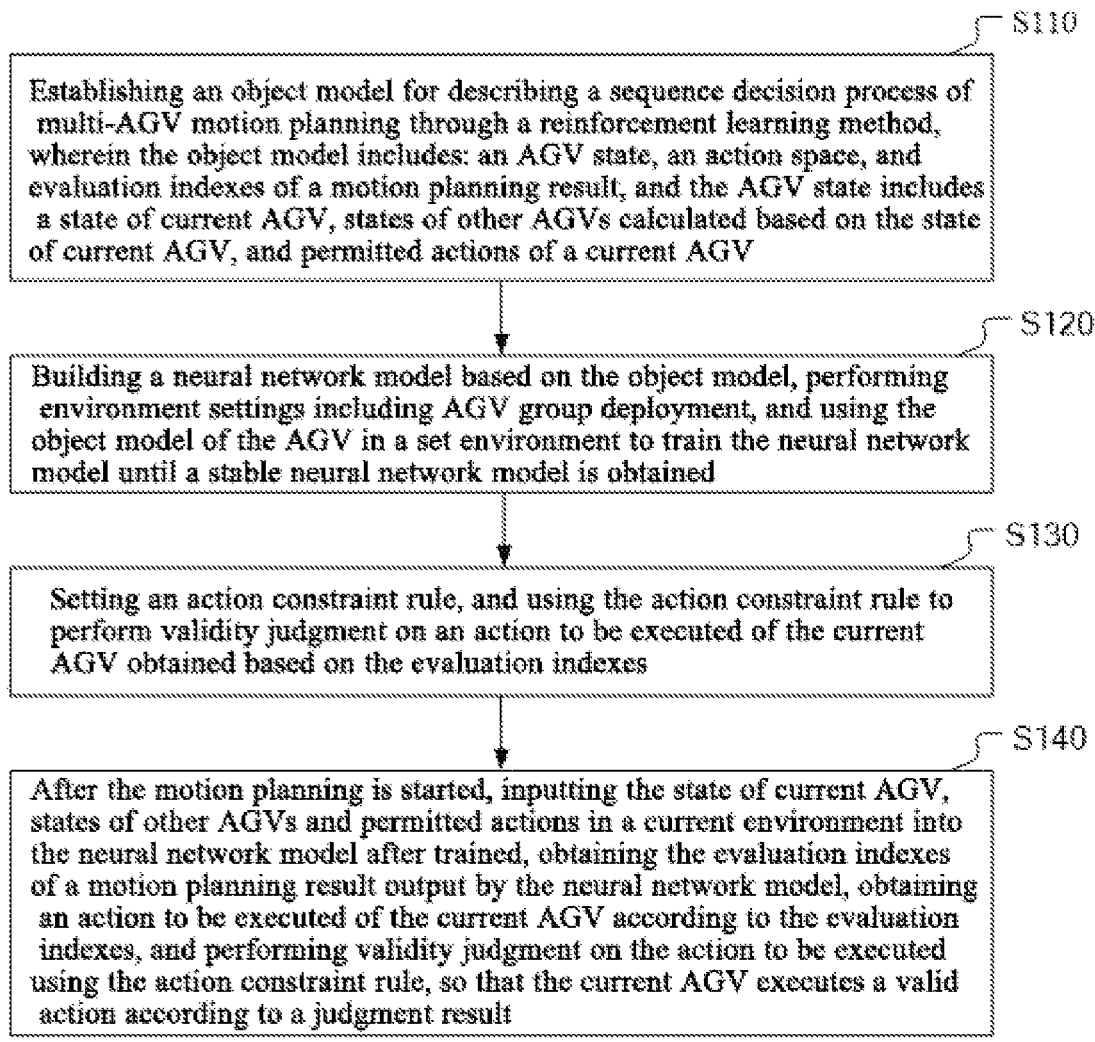
FIG. 1 is a schematic flowchart of a multi-AGV motion planning method according to an embodiment of the present disclosure.

Referring to FIG. 1, the method comprises the following steps:

Step S110, establishing an object model for describing a sequence decision process of multi-AGV motion planning through a reinforcement learning method, wherein the object model includes: an AGV state, an action space, and evaluation indexes of a motion planning result, and the AGV state includes a state of current AGV, states of other AGVs calculated based on the state of current AGV, and permitted actions of a current AGV;

In this step, the permitted actions of the current AGV are obtained according to the optimal path strategy and action space.

Step S120, building a neural network model based on the object model, performing environment settings including AGV group deployment, and using the object model of the AGV in a set environment to train the neural network model until a stable neural network model is obtained;

Step S130, setting an action constraint rule, and using the action constraint rule to perform validity judgment on an action to be executed of the current AGV obtained based on the evaluation indexes;

In this step, the action constraint rule can judge the validity of the action to be executed of the current AGV. When the action to be executed is judged to be a valid action, after the motion planning is started, the current AGV can directly execute the action to be executed. When the action to be executed is judged to be an invalid action, after the motion planning is started, the current AGV needs to extract multiple executable actions contained in the optimal path of the current AGV from the action space, and select the corresponding action to execute from the multiple executable actions.

Step S140, after the motion planning is started, inputting the state of current AGV, states of other AGVs and permitted actions in a current environment into the neural network model after trained, obtaining the evaluation indexes of a motion planning result output by the neural network model, obtaining a current AGV's action to be executed according to the evaluation indexes, and performing validity judgment on the action to be executed using the action constraint rule, so that the current AGV executes a valid action according to a judgment result.

As shown in FIG. 1, first, the present embodiment adopts a deep reinforcement learning method, takes advantage of the merits of neural network models in computing high-dimensional state space and the characteristics of reinforcement learning online control, and thus improves the performance of the multi-AGV motion planning method in dynamic environments; second, the present embodiment combines the optimal path search algorithm and the deep reinforcement learning algorithm, and constrains the learning direction of the deep reinforcement learning algorithm using the optimal path search algorithm, so that the AGV can plan a feasible route in a dense environment, and prevent the AGV from entering a local deadlock state.

Taking a multi-AGV motion environment as an example, the implementation steps of the current AGV motion planning method in a multi-AGV motion environment will be specifically described.

Figure 2:
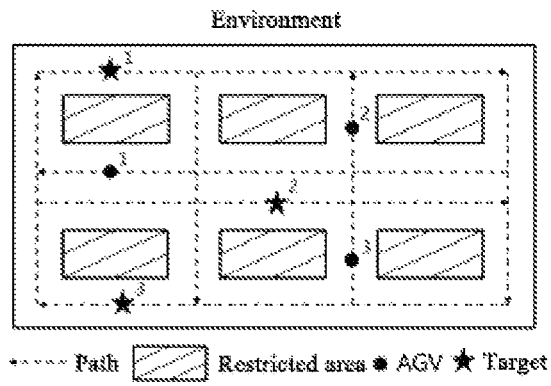
FIG. 2 is a schematic diagram of a multi-AGV motion environment according to an embodiment of the present disclosure.

Refer to the multi-AGV motion environment shown in FIG. 2, which is a common task scenario for AGVs, and is an environment such as a factory, warehouse, and logistics center. In FIG. 2, the black circle represents the position of the AGV; the black star represents the target position of the AGV; the oblique area represents the restricted area in the environment, such as obstacles, work areas, shelves, etc., which is generally drawn based on actual conditions such as maps and safety regulations of the task scene, and the AGV is not allowed to enter the restricted area; the dotted line represents the path, the arrow represents the direction of the path, and the AGV needs to drive along the path in the direction of the path; the road network is composed of paths and represents that the permitted driving route of the AGV in the environment. The path in the road network needs to form a closed loop, that is, if two points on the road network are randomly selected as the starting position and the target position, at least one path from the starting position to the target position can be searched out on the road network.

After building the multi-AGV motion environment, the motion planning algorithm design is carried out. The motion planning algorithm design includes: construction of object model, design and training of neural network model, and motion constraint design.

Construction of Object Model

In an embodiment, the above step S110 specifically uses a Markov decision process (MDP) to describe the object model, and the MDP is a mathematical model of sequential decision, which is used to simulate the random strategy and rewards that can be achieved by the agent in an environment in which the system state has Markov properties.

In the multi-AGV motion environment of the present embodiment, the object model includes: an AGV state, an action space, and evaluation indexes of the motion planning result. The AGV state includes a state $o_a$ of current AGV, states $\tilde{o}_a$ of other AGVs, and permitted actions $a_a$ of the current AGV. The evaluation indexes of the motion planning result include: a strategy $\pi$ and a value function V.

The state $o_a$ of current AGV includes: a speed of the current AGV in the body polar coordinate system, a target position, a size of current AGV, an average speed, and a road network distance between the current AGV and the target position.

The states $\tilde{o}_a$ of other AGVs include: relative positions of other AGVs in the body polar coordinate system of the current AGV, relative positions of targets of other AGVs in the body polar coordinate system of the current AGV, relative speeds of other AGVs in the body polar coordinate system of the current AGV, road network distances between other AGVs and their targets, sizes of other AGVs, a sum of the sizes of other AGVs and the size of current AGV, and road network distances between other AGVs and the current AGV.

The permitted actions $a_a$ of the current AGV are obtained according to the optimal path strategy and action space.

The action space a is the speed and angle in the body polar coordinate system of the current AGV.

The strategy $\pi$ is a strategy for describing selection of an action $a_t$ by the current AGV in a joint state at a moment t.

The value function V is for describing an expected return by adopting the strategy $\pi$ in a joint state $o_t$.

The joint state $o_t$ is a state composed of the state $o_a$ of current AGV, state $\tilde{o}_a$ of other AGVs and permitted actions $a_a$.

In an embodiment, the object model further includes: a reward r for describing a reward given to the current AGV for taking an action $a_t$, and a discount factor $\gamma$. The discount factor $\gamma$ is an attenuation factor used when calculating the reward obtained by the current AGV for performing the action $a_t$, and is used to adjust an output of the value function.

The specific contents of the above object model are as follows:

1. State s

The AGV state $s_a$ includes the AGV position, speed, target position, size, average speed of the latest n (n is an integer greater than 1) states, and the road network distance between the AGV and the target. The way to obtain the AGV state $s_a$ does not rely on a specific sensor. It can be expressed as:

$$s_a=[p_x,p_y,v_x,v_y,p_{gx},p_{gy},r,v_m,d_{grn}]\in R^9$$

where, in the Euclidean coordinate system $\Sigma_e$ based on the multi-AGV motion environment, $(p_x, p_y)$ represents the position of the AGV, $(v_x, v_y)$ represents the speed of the AGV, $(p_{gx}, p_{gy})$ represents the target position, r represents the size of the AGV, $v_m$ represents the average speed of the latest n states, $d_{grn}$ represents the road network distance between the AGV and the target.

Similarly, relative to the current AGV, the states $\tilde{s}_a$ of other AGVs in the multi-AGV motion environment are expressed as follows:

$$\tilde{s}_a=[\tilde{s}_{a,1},\ldots,\tilde{s}_{a,i},\ldots,\tilde{s}_{a,m}]\in R^{9\times m}$$

where $\tilde{s}_{a,i}$ represents the state of the i-th AGV and is expressed as:

$$\tilde{s}_{a,i}=[\tilde{p}_x,\tilde{p}_y,\tilde{v}_x,\tilde{v}_y,\tilde{p}_{gx},\tilde{p}_{gy},\tilde{r},\tilde{v}_m,\tilde{d}_{grn}]\in R^9$$

Observation o:

In order to adapt to different motion environments, avoid the impact of coordinate transformation, and achieve a decentralized training method, the present embodiment transforms the AGV state expressed in the global Euclidean coordinate system $\Sigma_e$ into the AGV observation state, i.e., the state $o_a$ of current AGV, in the body polar coordinate system $\Sigma_p$ of the current AGV, which is expressed as:

$$o_a=[r_v,\theta_v,r_g,\theta_g,r,v_m,d_{grn}]\in R^7$$

where $(r_v, \theta_v)$ represents the polar coordinates of the speed of the current AGV, $(r_g, \theta_g)$ represents the polar coordinates of the target of the current AGV, r represents the size of current AGV, $v_m$ represents the average speed of the latest n states, $d_{grn}$ represents the road network distance between the current AGV and the target.

Similarly, the states of other AGVs in the environment observed under the body polar coordinate system of the current AGV, i.e., the states of other AGVs, are expressed as:

$$\tilde{o}_a = [\tilde{o}_{a,1}, \ldots, \tilde{o}_{a,i}, \ldots, \tilde{o}_{a,m}]^T \in R^{10 \times m}$$

where $\tilde{o}_{a,i}$ represents the observation state of the i-th AGV, which can be expressed as:

$$\tilde{o}_{a,i} = [\tilde{r}_p, \tilde{\theta}_p, \tilde{r}_v, \tilde{\theta}_v, \tilde{r}_g, \tilde{\theta}_g, \tilde{d}_{grn}, \tilde{r}, r+\tilde{r}, \tilde{d}_{arn}] \in R^{10}$$

where $(\tilde{r}_p, \tilde{\theta}_p)$ represents the polar coordinates of the relative position of the i-th AGV in $\Sigma_p$, $(\tilde{r}_v, \tilde{\theta}_v)$ represents the polar coordinates of the relative speed of the i-th AGV in $\Sigma_p$, $(\tilde{r}_h, \tilde{\theta}_g)$ represents the polar coordinates of the relative position of the target of the i-th AGV in $\Sigma_p$, $\tilde{d}_{grn}$ represents the road network distance between the i-th AGV and the target, $\tilde{r}$ represents the size of the i-th AGV, $r+\tilde{r}$ represents the sum of the sizes of the i-th AGV and the current AGV, and $\tilde{d}_{arn}$ represents the road network distance between the i-th AGV and the current AGV.

Permitted Actions $a_a$:

The AGV travels along the optimal path from the starting position to the target position in the road network. Therefore, there is a constraint relationship between the permitted action of the AGV at the current position and the optimal path at the current position, which is expressed as that the direction of the permitted action is consistent with the direction of the optimal path. Based on this, the present embodiment uses the action space a and the optimal path direction $\theta_{or}$ to encode and obtain the permitted action $a_a$ of the current AGV at the current position. One way of encoding the action space a and the optimal path direction $\theta_{or}$ is:

$$a_a \mapsto a \cap \theta_{or} \in R$$

In the present embodiment, the optimal path (or optimal path direction $\theta_{or}$) of the AGV can be obtained in the road network using a path search algorithm according to the starting position and the target position. The path search algorithm includes the A* algorithm (A* is a direct search method for solving the shortest path in a static road network), Dijkstra algorithm (shortest path algorithm), M* algorithm (also known as Big M algorithm).

2. Action Space a

The action space a taken by the current AGV refers to the speed v and angle $\theta$ in the body polar coordinate system $\Sigma_p$ of the current AGV. The action space a is described based on the body polar coordinate system $\Sigma_p$ and is not affected by the coordinate transformation of the global coordinate system of different environments. It is expressed as follows:

$$a = [v, \theta] \in R^2$$

3. State Transition Model p

It is the probability distribution $p(o_{t+1}, o_t | a_t)$ of transitioning to the next joint state $o_t$ by the current AGV taking the action $a_t$ in the current joint state $o_t$.

4. Reward r

The reward function describes the rewards given to the current AGV for taking the action $a_t$ in the multi-AGV motion environment, and includes at least three description types. The first description type $R_{goal}$ is a reward given when the current AGV reaches or approaches the target position. The second description type $R_{agv}$ is a penalty given when the current AGV collides with or approaches other AGVs. The third description type $R_{rn}$ is a penalty given when the current AGV deviates from the road network.

The first description type $R_{goal}$ is set in the following way:
when the current AGV reaches the target position $p_g$, a positive maximum reward value $\alpha$ is given;
when the current AGV approaches the target position $p_g$, the positive discount reward value $i*\alpha$ is given;
when the current AGV is stationary or far away from the target position $p_g$, a negative discount reward value $-i*\alpha$ is given,
wherein a first discount coefficient i is set based on a road network distance, and a positive discount reward value $i*\alpha$ and a negative discount reward value $-i*\alpha$ are calculated from the first discount coefficient i and the maximum reward value $\alpha$.

The second description type $R_{agv}$ is set in the following way:
when distances between the current AGV and other AGVs are less than a first threshold condition $t_{agv}$, a maximum penalty value $\beta$ is given;
when distances between the current AGV and other AGVs are greater than the first threshold condition $t_{agv}$ and less than a second threshold condition $m*t_{agv}$, the discount penalty value $j*\beta$ is given;
when the distances between the current AGV and other AGVs are greater than the second threshold condition $m*t_{agv}$, no penalty will be given; m is a preset multiple,
wherein a second discount coefficient j is set based on a distance, and a discount penalty value $j*\beta$ is calculated from the second discount coefficient j and the maximum penalty value $\beta$.

The third description type $R_{rn}$ is set in the following way:
when a distance $d_{rn}$ between the current AGV and a current path is not less than a third threshold condition $t_{rn}$, a penalty $\delta$ is given;
when the distance $d_{rn}$ between the current AGV and the current path is less than the third threshold condition $t_{rn}$, no penalty is given.

At a moment t, the complete reward function $R_t$ is:

$$R_t = R_{goal} + R_{agv} + R_{rn}$$

5. Discount Factor $\gamma$

It is an attenuation factor used when calculating the reward obtained by the current AGV for performing the action $a_t$, and is used to adjust an output of the value function, $\gamma \in [0,1)$.

6. Strategy $\pi$

According to the current AGV's joint state $o_t$ at the moment t, the strategy $\pi$ of selecting the action $a_t$ by the current AGV can be described as:

$$\pi: (a_t | o_t; w_t)$$

where $w_t$ represents the parameters of the current neural network model. The goal of the strategy $\pi$ is to minimize the expected time for the current AGV to reach the target position, and avoid collisions with other AGVs and avoid deviation from the road network.

7. Value function V

It is the expected return of the current AGV adopting the strategy $\pi$ in the joint state $o_t$, which can be described as:

$$V(o_t; w_t) = E[R_t | o_t]$$

The parameters described above can be used to describe the object model based on the Markov decision process, and thus complete the construction of the object model.

Design and Training of Neural Network Model

In the present embodiment, the neural network model can be constructed by the following methods.

Figure 3:
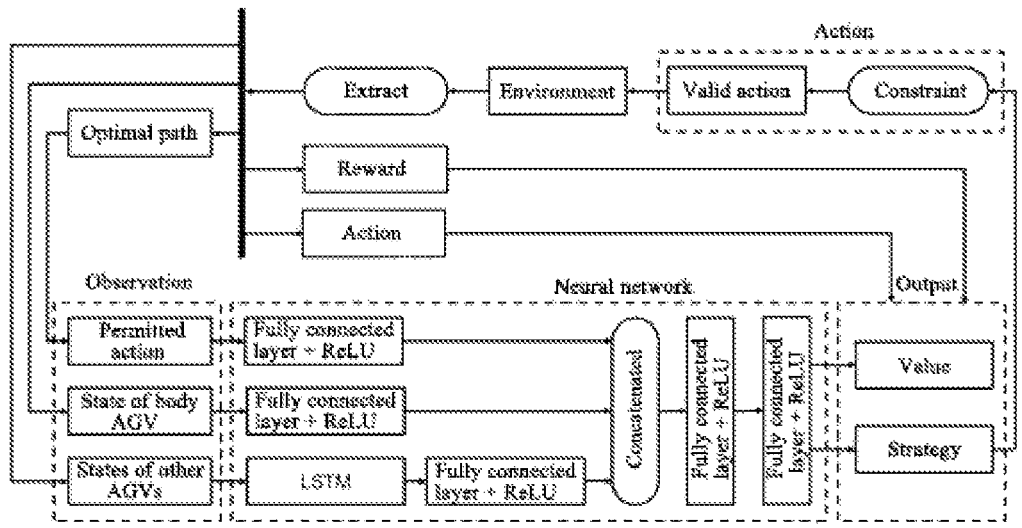
FIG. 3 is a schematic diagram of a multi-AGV motion planning design according to an embodiment of the present disclosure.

A fully connected neural network is used to build a neural network model. As shown in FIG. 3, the input of the neural network model includes the state of current AGV, the states of other AGVs, and the permitted actions of the current AGV;

the permission actions of the current AGV are input to a first single hidden layer fully connected neural network, the state of current AGV is input to a second single hidden layer fully connected neural network, the states of other AGVs are input to a long short-term memory (LSTM) network, and then to a third single hidden layer fully connected neural network, the outputs of three single hidden layer fully connected neural networks are concatenated into a tensor, then input to a double hidden layer fully connected neural network, and the double hidden layer fully connected neural network outputs the evaluation indexes of the motion planning result;

the output of the neural network model is the output of the double hidden layer fully connected neural network.

wherein the dimension of the third single hidden layer fully connected neural network is greater than the dimension of the first single hidden layer fully connected neural network, and the dimension of the third single hidden layer fully connected neural network is greater than the dimension of the second single hidden layer fully connected neural network. The fully connected layer and the activation function ReLU are serialized to form a single hidden layer fully connected neural network. Namely, the fully connected layer and ReLU are serialized to form the first single hidden layer fully connected neural network, the second single hidden layer fully connected neural network, and the third single hidden layer fully connected neural network.

Since in the present embodiment, the tensor dimension corresponding to the states of other AGVs is much larger than the tensor dimension of the permitted actions and the state of current AGV, if the states of other AGVs, the state of current AGV and the permitted actions are directly concatenated into a tensor and input to the neural network model, it will affect the performance of the neural network model due to the imbalance of dimensions of the input data, and results in poor output results. However, in the present embodiment, each of the three input tensors is first input to the corresponding single hidden layer fully connected neural network, and the tensors input are dimensionally balanced through the single hidden layer fully connected neural networks, and then concatenated into one tensor and input to the double hidden layer fully connected neural network, thereby improving the performance of the entire model.

In an embodiment, before inputting the states of other AGVs to the long short-term memory network, the distances between other AGVs and the current AGV are extracted first, the states of other AGVs are sorted according to the distance from the current AGV in descending order, and then input the sorted states of other AGVs into the LSTM.

In an embodiment, a deep reinforcement learning training framework can be established based on the GA3C training framework, and a neural network model can be built. The deep reinforcement learning training framework established is composed of three parts: an agent composed of multiple AGVs, a data queue, and a GPU-based neural network model.

It should be noted that GA3C refers to the Asynchronous Advantage Actor-Critic (A3C) algorithm applied to the Graphics Processing Unit (GPU). The GA3C framework uses GPUs for reinforcement learning training, and the model training speed and performance can be enhanced.

In a preferred embodiment, multiple parallel computing GPUs are added to the GA3C training framework to establish a multi-GPU based neural network model. Correspondingly, the deep reinforcement learning training framework is composed of an agent, a data queue, and a multi-GPU neural network model.

Figure 4:
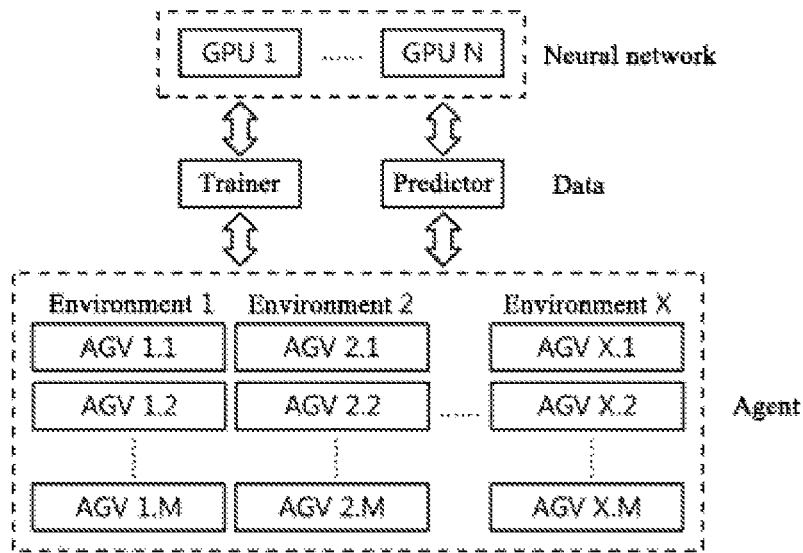
FIG. 4 is a schematic diagram of the structure of a deep reinforcement learning training framework established based on the GA3C framework according to an embodiment of the present disclosure.

As shown in FIG. 4, the deep reinforcement learning training framework in the present embodiment comprises:

an agent composed of multiple AGVs which is used to interact with the external environment, obtain real-time data such as the state and actions of the AGV, and provide data for building a deep reinforcement learning training framework.

The data queue includes a predictor and a trainer, and the training data and prediction data obtained are stored in the data queue.

Among them, the predictor selects the action $a_t$ according to the current strategy $\pi$, collects the AGV state and action space as training data, and inputs them to the trainer for training; the predictor inputs the state of current AGV to the neural network model, obtains the strategy $\pi$ and value function V from the neural network model, select the action $a_t$, and calculate the reward r to obtain the prediction data; the trainer inputs the state of current AGV, permitted actions, and states other AGVs to the neural network model and trains the neural network model to update the parameters of the neural network model.

In an embodiment, the step S120 in FIG. 1 is specifically setting at least one environment, wherein multiple AGVs are deployed in each environment, and a quantity of maps and/or road networks and/or AGVs in each environment is different; inputting the state of current AGV, states of other AGVs and permitted actions of current AGV in each environment to the neural network model for training, so as to update the parameters of the neural network model.

It is understandable that different environments may be different, partially same or completely consistent in various aspects such as paths, restricted areas, quantity of AGVs, and targets. Increasing the environment types can promote the training of algorithms in different environments and ensure the applicability of the model.

In an embodiment, the multi-GPU neural network model is composed of multiple parallel computing GPUs to form a multi-GPU neural network model based on deep reinforcement learning.

In an embodiment, the process of updating the parameters of the neural network model comprises:

using the state of current AGV, permitted actions, and states of other AGVs as training data; randomly initializing neural network model parameters, and calculating a strategy loss function $f_\pi(w)$ and a value function loss function $f_v(w)$ based on the action $a_t$ obtained and the reward r obtained; updating parameters of the neural network model in each GPU through a back propagation algorithm to train the neural network model; detecting change processes of the reward r accumulated, the strategy loss function $f_\pi(w)$ and the value function loss function $f_v(w)$ over a period of time, and judging performance of the neural network model according to the reward and loss functions until a stable neural network model is obtained.

In the present embodiment, the higher the accumulated reward, the better the performance of the neural network model, and the lower the value of the loss function, the better the performance of the neural network model. When the values of the reward and loss functions both reach a stable interval, a stable neural network model can be obtained.

Among them, the strategy loss function $f_\pi(w)$ is expressed as:

$$f_\pi(w) = \log \pi(a_t|o_t;w_t)(R_t - V(o_t;w_t)) + \phi H(\pi(o_t;w))$$

Among them, $\phi H(\pi(o_t; w))$ represents a regular term in the strategy loss function $f_\pi(w)$ which plays the role of adjusting $f_\pi(w)$.

The value function loss function $f_v(w)$ is expressed as:

$$f_v(w) = (R_t - V(o_t;w_t))^2$$

Action Constraint Design

In the present embodiment, the action constraint rule is used to restrict the strategy output by the neural network model, and further restrict the action selection of the current AGV, so as to constrain the action executed by the current AGV within an action range permitted by the optimal path, and promote the convergence of model in the training process.

In an embodiment, the action to be executed of the current AGV obtained based on the evaluation indexes in the step S130 in FIG. 1 may be the action with the highest probability in the strategy output by the neural network which is selected by a greedy algorithm.

Correspondingly, in FIG. 1, performing validity judgment on the action to be executed using the action constraint rule, so that the current AGV executes a valid action according to a judgment result comprises:

judging whether the action to be executed is a permitted action of the current AGV;

if the action to be executed is a permitted action of the current AGV, the current AGV executes the action to be executed;

if the action to be executed is not a permitted action of the current AGV, calculating and executing a valid action of the current AGV according to the evaluation indexes of the motion planning result output by the neural network model and the permitted action of the current AGV.

Specifically: extracting a plurality of first permitted actions included in an optimal path from the action space of the current AGV;

selecting a second permitted action satisfying a preset condition from the plurality of first permitted actions using the evaluation indexes of the motion planning result output by the neural network model; and calculating whether a collision will occur if the current AGV performs the second permitted action according to states of other AGVs, and if a collision will occur, executing a stationary action by the current AGV; if a collision will not occur, executing the second permitted action by the current AGV.

In an embodiment, the probability value corresponding to each first permitted action can be calculated using the strategy $\pi$, and a first permitted action corresponding to the largest probability value is selected as the second permitted action.

Corresponding to the foregoing method, the present disclosure also provides a multi-AGV motion planning device.

Figure 5:
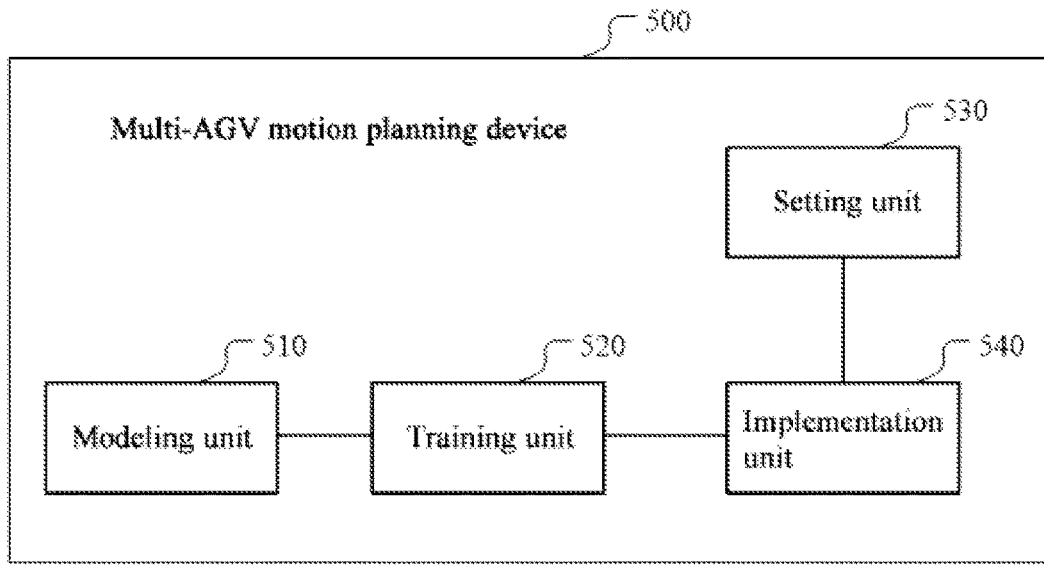
FIG. 5 is a functional block diagram of a multiple AGV motion planning device according to an embodiment of the present disclosure.

FIG. 5 is a functional block diagram of a multi-AGV motion planning device according to an embodiment of the present disclosure. As shown in FIG. 5, the multi-AGV motion planning device 500 comprises:

a modeling unit 510 for establishing an object model for describing a sequence decision process of multi-AGV motion planning through a reinforcement learning method, wherein the object model includes: an AGV state, an action space, and evaluation indexes of a motion planning result, and the AGV state includes a state of current AGV, states of other AGVs calculated based on the state of current AGV, and permitted actions of a current AGV;

a training unit 520 for building a neural network model based on the object model, performing environment settings including AGV group deployment, and using the object model of the AGV in a set environment to train the neural network model until a stable neural network model is obtained;

a setting unit 530 for setting an action constraint rule, and using the action constraint rule to perform validity judgment on an action to be executed of the current AGV obtained based on the evaluation indexes; and an implementation unit 540 for, after the motion planning is started, inputting the state of current AGV, states of other AGVs and permitted actions in a current environment into the neural network model after trained, obtaining the evaluation indexes of a motion planning result output by the neural network model, obtaining an action to be executed of the current AGV according to the evaluation indexes, and performing validity judgment on the action to be executed using the action constraint rule, so that the current AGV executes a valid action according to a judgment result.

In an embodiment, the implementation unit 540 comprises a judgment module, a first action execution module, and a second action execution module;

the judgment module is for judging whether the action to be executed is a permitted action of the current AGV;

the first action execution module is for, when the action to be executed is a permitted action of the current AGV, causing the current AGV to execute the action to be executed;

the second action execution module is for, when the action to be executed is not a permitted action of the current AGV, calculating and executing a valid action of the current AGV according to the evaluation indexes of the motion planning result output by the neural network model and the permitted action of the current AGV.

In an embodiment, the second action execution module is also for extracting a plurality of first permitted actions included in an optimal path from the action space of the current AGV; selecting a second permitted action satisfying a preset condition from the plurality of first permitted actions using the evaluation indexes of the motion planning result output by the neural network model; calculating whether a collision will occur if the current AGV performs the second permitted action according to states of other AGVs, and if a collision will occur, executing a stationary action by the current AGV; if a collision will not occur, executing the second permitted action by the current AGV.

In an embodiment, the evaluation indexes of the motion planning result include: a strategy $\pi$ for describing selection of an action $a_t$ by the current AGV in a joint state at a moment t and a value function V for describing an expected return by adopting the strategy $\pi$ in a joint state, and the joint state is a state composed of the state of current AGV, states of other AGVs and permitted actions; and the second action execution module is specifically for calculating a probability value corresponding to each first permitted action using the strategy π, and selecting a first permitted action corresponding to the largest probability value as the second permitted action.

In an embodiment, the modeling unit 510 uses the Markov decision process to describe the object model, the permitted actions are obtained according to an optimal path strategy and an action space, and the action space is a speed and an angle in a body polar coordinate system of the current AGV;

the state of current AGV includes: a speed of the current AGV in the body polar coordinate system, a target position, a size of current AGV, an average speed, and a road network distance between the current AGV and the target position;

the states of other AGVs include: relative positions of other AGVs in the body polar coordinate system of the current AGV, relative positions of targets of other AGVs in the body polar coordinate system of the current AGV, relative speeds of other AGVs in the body polar coordinate system of the current AGV, road network distances between other AGVs and their targets, sizes of other AGVs, a sum of the sizes of other AGVs and the size of current AGV, and road network distances between other AGVs and the current AGV.

The object model further includes: a reward for describing a reward given to the current AGV for taking an action, the reward includes at least three description types: a first description type which is a reward given when the current AGV reaches or approaches the target position, a second description type which is a penalty given when the current AGV collides with or approaches other AGVs, and a third description type which is a penalty given when the current AGV deviates from the road network;

wherein the first description type is set in the following way:

when the current AGV reaches the target position $p_g$, a positive maximum reward value a is given; a first discount coefficient i is set based on a road network distance, a positive discount reward value $i*\alpha$ and a negative discount reward value $-i*\alpha$ are calculated from the first discount coefficient i and the maximum reward value α, and when the current AGV approaches the target position $p_g$, the positive discount reward value $i*\alpha$ is given; when the current AGV is stationary or far away from the target position $p_g$, a negative discount reward value $-i*\alpha$ is given;

the second description type is set in the following way:

when distances between the current AGV and other AGVs are less than a first threshold condition $t_{agv}$, a maximum penalty value β is given; a second discount coefficient j is set based on a distance, a discount penalty value $j*\beta$ is calculated from the second discount coefficient j and the maximum penalty value β, and when distances between the current AGV and other AGVs are greater than the first threshold condition $t_{agv}$ and less than a second threshold condition $m*t_{agv}$, the discount penalty value $j*\beta$ is given; and when the distances between the current AGV and other AGVs are greater than the second threshold condition $m*t_{agv}$, no penalty will be given; m is a preset multiple;

the third description type is set in the following way:

when a distance between the current AGV and a current path is not less than a third threshold condition $t_m$, a penalty δ is given; when the distance between the current AGV and the current path is less than the third threshold condition $t_m$, no penalty is given.

In an embodiment, the training unit 520 comprises a model building module for building the neural network model using a fully connected neural network, wherein an input of the neural network model includes the state of current AGV, the states of other AGVs, and the permitted actions of the current AGV; the permission actions of the current AGV are input to a first single hidden layer fully connected neural network, the state of current AGV is input to a second single hidden layer fully connected neural network, the states of other AGVs are input to a long short-term memory network, and then to a third single hidden layer fully connected neural network, the outputs of three single hidden layer fully connected neural networks are concatenated into a tensor, then input to a double hidden layer fully connected neural network, and the double hidden layer fully connected neural network outputs the evaluation indexes of the motion planning result; the dimension of the third single hidden layer fully connected neural network is greater than the dimension of the first single hidden layer fully connected neural network, and the dimension of the third single hidden layer fully connected neural network is greater than the dimension of the second single hidden layer fully connected neural network.

In an embodiment, the training unit 520 further comprises an environment setting module for setting at least one environment, wherein multiple AGVs are deployed in each environment, and a quantity of maps and/or road networks and/or AGVs in each environment is different; and inputting the state of current AGV, states of other AGVs and permitted actions in each environment into the neural network model for training, so as to update parameters of the neural network model.

The device embodiments described above are merely illustrative, and the specific implementations may refer to the specific implementations of the foregoing method embodiments, which will not be repeated herein.

Figure 6:
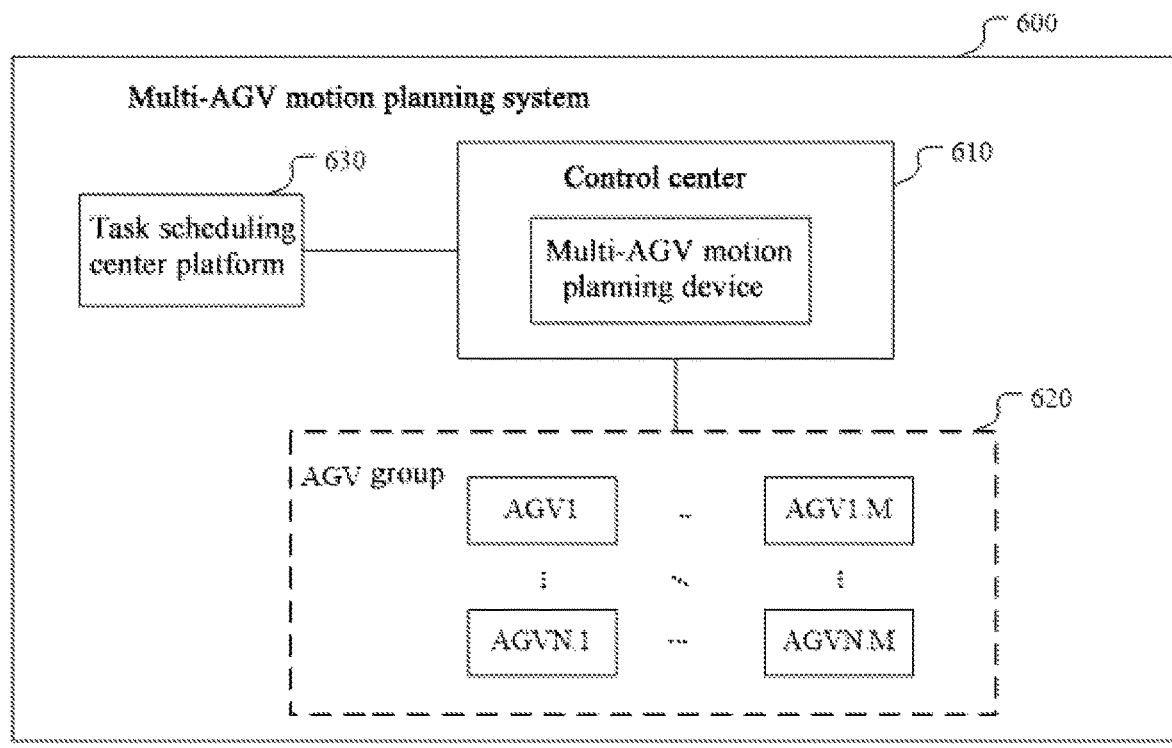
FIG. 6 is a schematic diagram of the structure of a multiple AGV motion planning system according to an embodiment of the present disclosure.
Figure 7:
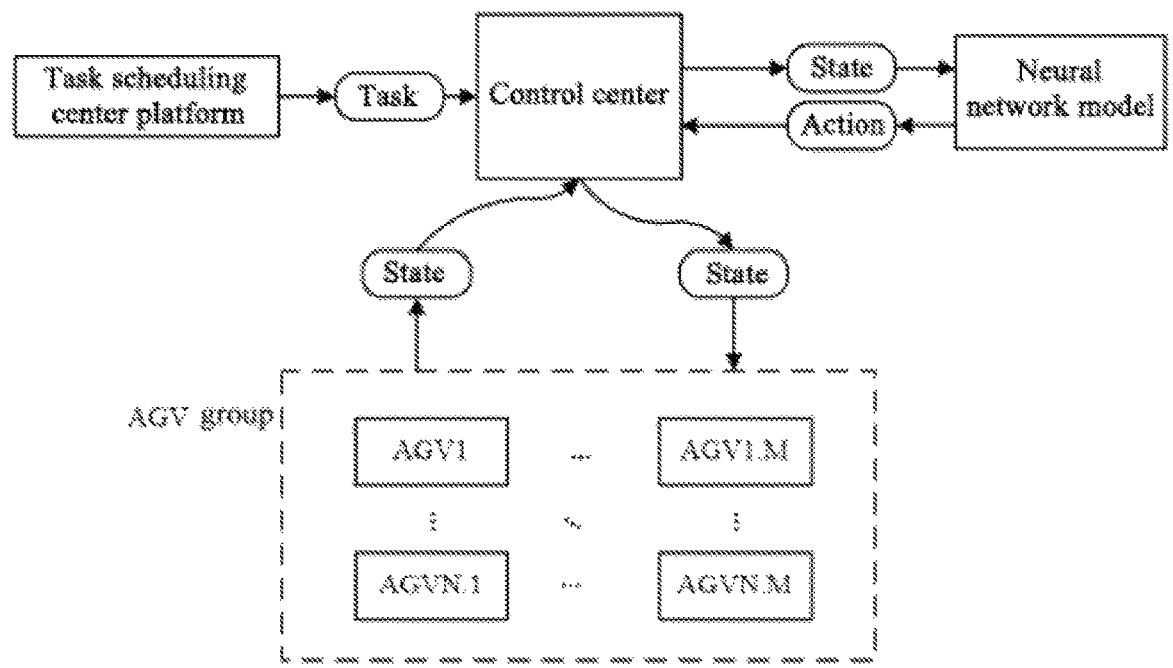
FIG. 7 is a schematic diagram of a control state of a system by a control center according to an embodiment of the present disclosure.

FIG. 6 is a schematic diagram of the structure of a multi-AGV motion planning system according to an embodiment of the present disclosure. FIG. 7 is a schematic diagram of a control state of the system by a control center according to an embodiment of the present disclosure. As shown in FIG. 6 and FIG. 7, the multi-AGV motion planning system 600 comprises: a control center 610 for deploying the multi-AGV motion planning device 500, an AGV group 620 composed of multiple AGVs deployed in an environment, and a task scheduling center platform 630.

The AGVs in the AGV group 620 use their own sensors to obtain their own states and upload them to the control center 610, receive the action instructions issued by the control center 610, and execute actions corresponding to the action instructions.

The AGVs in the same environment run in a multi-process mode, realizes multi-AGV data communication through multi-process data sharing technology, and at the same time, realizes multi-AGV synchronous operation through multi-process data synchronization technology.

The task scheduling center platform 630 is configured to complete task planning and task dispatch, and send a task of a certain AGV to the control center 610, and the control center 610 controls the AGV to complete the task.

For example, the task scheduling center platform sends the task of the j-th AGV to the control center, and the control center controls the j-th AGV to complete the task. The task scheduling center platform may include a display interface for real-time supervising how the AGV group execute the tasks, and timely intervening in unexpected situations such as collisions and environmental changes.

The control center 610 has a built-in stable neural network model, inputs a state of an AGV received into the neural network model, uses the neural network model to calculate a motion planning strategy of the AGV, and then generates action instructions according to the motion planning strategy and issues them to the AGV.

In sum, first, the technical solution of the present disclosure adopts a deep reinforcement learning method, takes advantage of the merits of neural network models in computing high-dimensional state space and the characteristics of reinforcement learning online control, and thus improves the performance of the multi-AGV motion planning method in dynamic environments. Second, the present embodiment combines the optimal path search algorithm and the deep reinforcement learning algorithm, and constrains the learning direction of the deep reinforcement learning algorithm using the optimal path search algorithm, so that the AGV can plan a feasible route in a dense environment, and prevent the AGV from entering a local deadlock state.

It should be noted:

The algorithms and demonstrations given here are not intrinsically associated with any particular computer, virtual system, or other device. All general-purpose system can be used in conjunction with demonstrations here. Based on the above descriptions, architectures for constructing such a system are apparent. In addition, the present disclosure is not dependent on any particular programming language. It is understandable that various programming languages can be used to realize contents of the present disclosure described herein, and that the above descriptions concerning specific languages are intended to reveal the best implementation of the present disclosure.

Those skilled in the art can understand that it is possible to adaptively change the modules in the device in the embodiments and set them in one or more devices different from the embodiments. The modules or units or components in the embodiments can be combined into one module or unit or component, and in addition, they can be divided into multiple sub-modules or sub-units or sub-components. Except that at least some of such features and/or processes or units are mutually exclusive, any combination can be used to combine all features disclosed in this specification (including the accompanying claims, abstract and drawings) and all processes or units of any method or device disclosed in such a way. Unless expressly stated otherwise, each feature disclosed in this specification (including the accompanying claims, abstract and drawings) may be replaced by an alternative feature providing the same, equivalent or similar purpose.

In addition, those skilled in the art can understand that, although some embodiments described herein include some but not other features included in other embodiments, combinations of features of different embodiments are meant to be within the scope of the present disclosure, and form different embodiments, as would be understood by those in the art. For example, in the following claims, any of the claimed embodiments can be used in any combination way.

The various component embodiments of the present disclosure may be implemented by hardware, or by software modules running on one or more processors, or by their combination. Those skilled in the art should understand that a microprocessor or a digital signal processor (DSP) can be used in practice to implement some or all functions of some or all the components of the multi-AGV motion planning device according to the embodiments of the present disclosure. The present disclosure can also be implemented as a device or device program (for example, a computer program and a computer program product) for executing part or all of the methods described herein. Such a program for realizing the present disclosure may be stored on a computer readable medium, or may have the form of one or more signals. Such signals can be downloaded from Internet websites, or provided on carrier signals, or provided in any other form.

Figure 8:
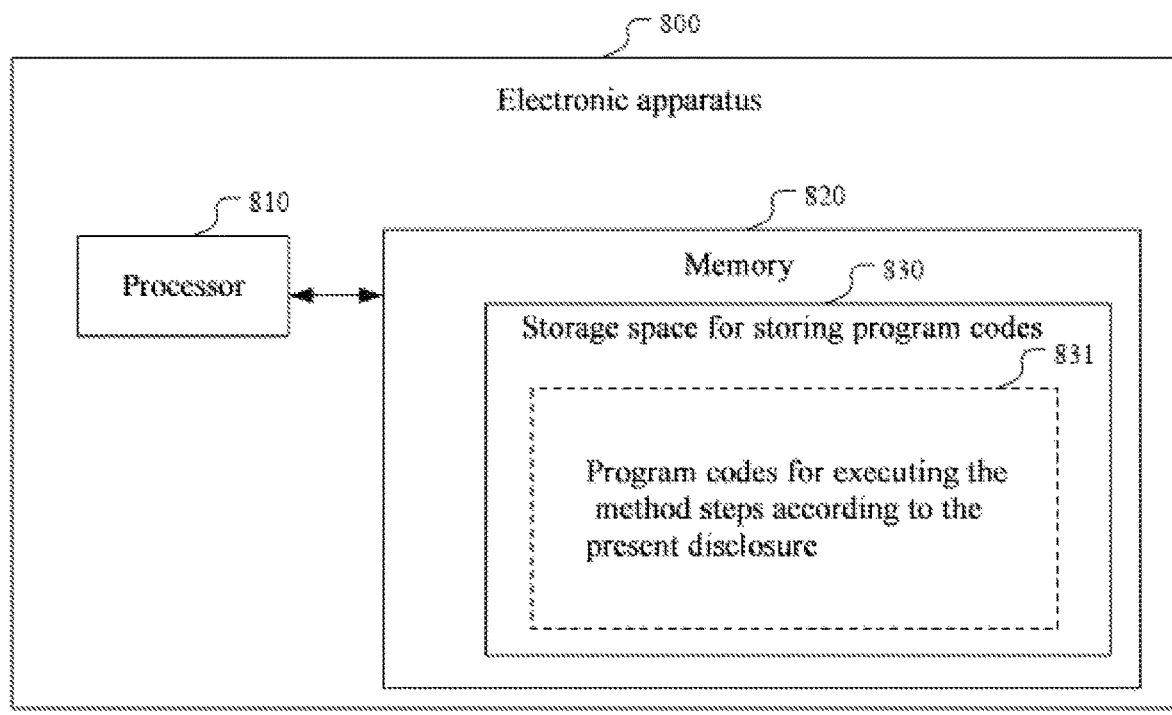
FIG. 8 is a schematic diagram of the structure of an electronic device according to an embodiment of the present disclosure.

For example, FIG. 8 is a schematic diagram of the structure of an electronic apparatus according to an embodiment of the present disclosure. The electronic apparatus 800 includes a processor 810 and a memory 820 arranged to store computer executable instructions (computer readable program codes). The memory 820 may be an electronic memory such as flash memory, EEPROM (electrically erasable programmable read only memory), EPROM, hard disk, or ROM. The memory 820 has a storage space 830 for storing computer readable program codes 831 for executing any method steps in the above methods. For example, the storage space 830 for storing computer readable program codes may include various computer readable program codes 831 respectively used to implement various steps in the above method. The computer readable program code 831 may be read from or written into one or more computer program products. These computer program products include program code carriers such as hard disks, compact disks (CDs), memory cards or floppy disks. Such a computer program product is typically a computer readable storage medium as shown in, for example, FIG. 9.

Figure 9:
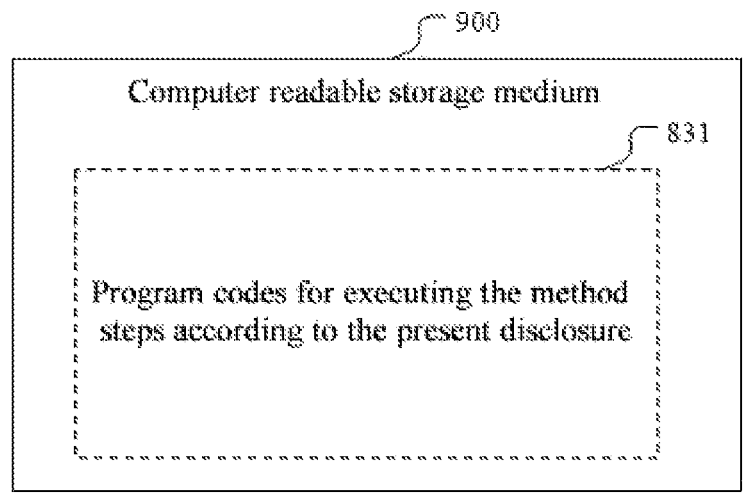
FIG. 9 is a schematic diagram of the structure of a computer readable storage medium according to an embodiment of the present disclosure.

FIG. 9 is a schematic diagram of the structure of a computer readable storage medium according to an embodiment of the present disclosure. The computer readable storage medium 900 stores the computer readable program code 831 for executing the method steps according to the present disclosure, which can be read by the processor 810 of the electronic apparatus 800. When the computer readable program code 831 is run by the electronic apparatus 800, the electronic apparatus 800 is caused to execute each step in the methods described above. Specifically, the computer readable program code 831 stored in the computer readable storage medium can execute the methods shown in any of the above embodiments. The computer readable program code 831 may be compressed in an appropriate form.

It should be noted that the above embodiments illustrate rather than limit the present disclosure, and those skilled in the art can design alternative embodiments without departing from the scope of the appended claims. In the claims, any reference signs placed between parentheses should not be constructed as a limitation to the claims. The word "comprising" does not exclude the presence of elements or steps not listed in the claims. The word "a" or "an" preceding an element does not exclude the presence of multiple such elements. The present disclosure can be implemented by means of hardware comprising several different elements and by means of a suitably programmed computer. In the unit claims enumerating several devices, several of these devices may be embodied in the same hardware item. The use of the words "first", "second" and "third" does not indicate any order. These words can be interpreted as names.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment, it being understood that various changes may be made in the function and arrangement of elements described in an exemplary embodiment without departing from the scope of the invention as set forth in the appended claims and their legal equivalents.

What is claimed is:

1. A multi-AGV motion planning method, executed by a multi-AGV motion planning device provided with a processor which executes a program, comprising:
in the processor, establishing an object model for describing a sequence decision process of multi-AGV motion planning through a reinforcement learning method, wherein the object model includes: an AGV state obtained by a sensor of an AGV, an action space, and evaluation indexes of a motion planning result, and the AGV state includes a state of a current AGV, states of other AGVs calculated based on the state of the current AGV, and permitted actions of the current AGV;
in the processor, building a neural network model based on the object model, performing environment settings including AGV group deployment, and using the object model of the AGV in a set environment to train the neural network model until a stable neural network model is obtained;
in the processor, setting an action constraint rule, and using the action constraint rule to perform validity judgment on an action to be executed by the current AGV obtained based on the evaluation indexes; and
in the processor, after the motion planning is started, inputting the state of the current AGV, the states of other AGVs and the permitted actions in a current environment into the neural network model after training, obtaining the evaluation indexes of the motion planning result output by the neural network model, obtaining the action to be executed by the current AGV according to the evaluation indexes, and performing validity judgment on the action to be executed using the action constraint rule, and sending a judgment result to the current AGV and controlling the current AGV to execute a valid action,
the state of current AGV includes: a speed of the current AGV in the body polar coordinate system, a target position, a size of current AGV, an average speed, and a road network distance between the current AGV and the target position;
the states of other AGVs include: relative positions of other AGVs in the body polar coordinate system of the current AGV, relative positions of targets of other AGVs in the body polar coordinate system of the current AGV, relative speeds of other AGVs in the body polar coordinate system of the current AGV, road network distances between other AGVs and their targets, sizes of other AGVs, a sum of the sizes of other AGVs and the size of current AGV, and road network distances between other AGVs and the current AGV,
wherein the object model further includes: a reward for describing a reward given to the current AGV for taking an action, the reward includes at least three description types: a first description type which is a reward given when the current AGV reaches or approaches the target position, a second description type which is a penalty given when the current AGV collides with or approaches other AGVs, and a third description type which is a penalty given when the current AGV deviates from the road network;
wherein the first description type is set in the following way:
when the current AGV reaches the target position $p_g$, giving a positive maximum reward value $\alpha$; setting a first discount coefficient i based on a road network distance, calculating a positive discount reward value $i*\alpha$ and a negative discount reward value $-i*\alpha$ from the first discount coefficient i and the maximum reward value $\alpha$, and when the current AGV approaches the target position $p_g$, giving the positive discount reward value $i*\alpha$; when the current AGV is stationary or far away from the target position $p_g$, giving a negative discount reward value $-i*\alpha$;
the second description type is set in the following way:
when distances between the current AGV and other AGVs are less than a first threshold condition $t_{agv}$, giving a maximum penalty value $\beta$: setting a second discount coefficient j based on a distance, calculating a discount penalty value $j*\beta$ from the second discount coefficient j and the maximum penalty value $\beta$, and when distances between the current AGV and other AGVs are greater than the first threshold condition $t_{agv}$ and less than a second threshold condition $m*t_{agv}$, giving the discount penalty value $j*\beta$; and when the distances between the current AGV and other AGVs are greater than the second threshold condition $m*t_{agv}$, giving no penalty; m is a preset multiple;
the third description type is set in the following way:
when a distance between the current AGV and a current path is not less than a third threshold condition $t_m$, giving a penalty $\delta$: when the distance between the current AGV and the current path is less than the third threshold condition $t_m$, giving no penalty.

2. The method according to claim 1, wherein performing validity judgment on the action to be executed using the action constraint rule, sending a judgment result to the current AGV and controlling the current AGV executes a valid action comprises:
judging whether the action to be executed is a permitted action of the current AGV;
if the action to be executed is a permitted action of the current AGV, controlling the current AGV to execute the action to be executed;
if the action to be executed is not a permitted action of the current AGV, calculating a valid action of the current AGV according to the evaluation indexes of the motion planning result output by the neural network model and the permitted action of the current AGV, and controlling the current AGV to execute the valid action.

3. The method according to claim 2, wherein if the action to be executed is not a permitted action of the current AGV, calculating a valid action of the current AGV according to the evaluation indexes of the motion planning result output by the neural network model and the permitted action of the current AGV, and controlling the current AGV to execute the valid action comprises:
extracting a plurality of first permitted actions included in an optimal path from the action space of the current AGV;
selecting a second permitted action satisfying a preset condition from the plurality of first permitted actions using the evaluation indexes of the motion planning result output by the neural network model; and
calculating whether a collision will occur if the current AGV performs the second permitted action according to states of other AGVs, and if a collision will occur, controlling the current AGV to execute a stationary action; and if a collision will not occur, controlling the current AGV to execute the second permitted action.

4. The method according to claim 3, wherein the evaluation indexes of the motion planning result include: a strategy π for describing selection of an action $a_t$ by the current AGV in a joint state at a moment t and a value function V for describing an expected return by adopting the strategy π in a joint state, and the joint state is a state composed of the state of current AGV, states of other AGVs and permitted actions;
selecting a second permitted action satisfying a preset condition from the plurality of first permitted actions using the evaluation indexes of the motion planning result output by the neural network model comprises:
calculating a probability value corresponding to each first permitted action using the strategy π, and selecting a first permitted action corresponding to the largest probability value as the second permitted action.

5. The method according to claim 1, wherein the object model is described using a Markov decision process, the permitted actions are obtained according to an optimal path strategy and an action space, and the action space is a speed and an angle in a body polar coordinate system of the current AGV.

6. The method according to claim 1, wherein in the processor, building a neural network model based on the object model comprises:
building the neural network model using a fully connected neural network, wherein an input of the neural network model includes the state of current AGV, the states of other AGVs, and the permitted actions of the current AGV;
inputting the permitted actions of the current AGV to a first single hidden layer fully connected neural network,
inputting the state of current AGV to a second single hidden layer fully connected neural network,
inputting the states of other AGVs to a long short-term memory network, and then to a third single hidden layer fully connected neural network,
concatenating outputs of three single hidden layer fully connected neural networks into a tensor, then inputting the tensor to a double hidden layer fully connected neural network, and outputting the evaluation indexes of the motion planning result by the double hidden layer fully connected neural network;
a dimension of the third single hidden layer fully connected neural network is greater than a dimension of the first single hidden layer fully connected neural network, and the dimension of the third single hidden layer fully connected neural network is greater than a dimension of the second single hidden layer fully connected neural network.

7. The method according to claim 6, wherein before inputting the states of other AGVs to a long short-term memory network, the method further comprises:
extracting distances between other AGVs and the current AGV, sorting the states of other AGVs according to a distance from the current AGV in descending order, and then inputting the states of other AGVs to the long short-term memory network.

8. The method according to claim 6, wherein in the processor, building a neural network model based on the object model further comprises:
forming a single hidden layer fully connected neural network by serializing a fully connected layer and an activation function.

9. The method according to claim 1, wherein performing environment settings including AGV group deployment, and using the object model of the AGV in a set environment to train the neural network model comprises:
setting at least one environment, wherein multiple AGVs are deployed in each environment, and a quantity of maps and/or road networks and/or AGVs in each environment is different; and
inputting the state of current AGV, states of other AGVs and permitted actions in each environment into the neural network model for training, so as to update parameters of the neural network model.

10. The method according to claim 1, wherein
at a moment t, obtaining a reward $R_t$ given to the current AGV for taking an action in the following way based on rewards of three description types:

$$R_t = R_{goal} + R_{agv} + R_m$$

where $R_{goal}$ is the first description type, $R_{agv}$ is the second description type, and $R_m$ is the third description type.

11. A multi-AGV motion planning device, comprising a processor which executes a program, the multi-AGV motion planning device further comprises:
a modeling unit for establishing an object model for describing a sequence decision process of multi-AGV motion planning through a reinforcement learning method, wherein the object model includes: an AGV state obtained by a sensor of an AGV, an action space, and evaluation indexes of a motion planning result, and the AGV state includes a state of a current AGV, states of other AGVs calculated based on the state of the current AGV, and permitted actions of the current AGV;
a training unit for building a neural network model based on the object model, performing environment settings including AGV group deployment, and using the object model of the AGV in a set environment to train the neural network model until a stable neural network model is obtained;
a setting unit for setting an action constraint rule, and using the action constraint rule to perform validity judgment on an action to be executed by the current AGV obtained based on the evaluation indexes; and
an implementation unit for, after the motion planning is started, inputting the state of the current AGV, the states of other AGVs and the permitted actions in a current environment into the neural network model after training, obtaining the evaluation indexes of the motion planning result output by the neural network model, obtains the action to be executed by the current AGV according to the evaluation indexes, and performing validity judgment on the action to be executed using the action constraint rule, and sending a judgment result to the current AGV and controlling the current AGV to execute a valid action,
the state of current AGV includes: a speed of the current AGV in the body polar coordinate system, a target position, a size of current AGV, an average speed, and a road network distance between the current AGV and the target position;
the states of other AGVs include: relative positions of other AGVs in the body polar coordinate system of the current AGV, relative positions of targets of other AGVs in the body polar coordinate system of the current AGV, relative speeds of other AGVs in the body polar coordinate system of the current AGV, road network distances between other AGVs and their targets, sizes of other AGVs, a sum of the sizes of other AGVs and the size of current AGV, and road network distances between other AGVs and the current AGV, wherein the object model further includes: a reward for describing a reward given to the current AGV for taking an action, the reward includes at least three description types: a first description type which is a reward given when the current AGV reaches or approaches the target position, a second description type which is a penalty given when the current AGV collides with or approaches other AGVs, and a third description type which is a penalty given when the current AGV deviates from the road network;

wherein the first description type is set in the following way:

when the current AGV reaches the target position $p_g$, giving a positive maximum reward value $\alpha$; setting a first discount coefficient i based on a road network distance, calculating a positive discount reward value $i*\alpha$ and a negative discount reward value $-i*\alpha$ from the first discount coefficient i and the maximum reward value $\alpha$, and when the current AGV approaches the target position $p_g$, giving the positive discount reward value $i*\alpha$; when the current AGV is stationary or far away from the target position $p_g$, giving a negative discount reward value $-i*\alpha$;

the second description type is set in the following way:

when distances between the current AGV and other AGVs are less than a first threshold condition $t_{agv}$, giving a maximum penalty value $\beta$; setting a second discount coefficient j based on a distance, calculating a discount penalty value $j*\beta$ from the second discount coefficient j and the maximum penalty value $\beta$, and when distances between the current AGV and other AGVs are greater than the first threshold condition $t_{agv}$ and less than a second threshold condition $m*t_{agv}$, giving the discount penalty value $j*\beta$; and when the distances between the current AGV and other AGVs are greater than the second threshold condition $m*t_{agv}$, giving no penalty; m is a preset multiple;

the third description type is set in the following way:

when a distance between the current AGV and a current path is not less than a third threshold condition $t_{rn}$, giving a penalty $\delta$; when the distance between the current AGV and the current path is less than the third threshold condition $t_{rn}$, giving no penalty.

12. The device according to claim 11, wherein the implementation unit comprises a judgment module, a first action execution module, and a second action execution module;

the judgment module is for judging whether the action to be executed is a permitted action of the current AGV;

the first action execution module is for, when the action to be executed is a permitted action of the current AGV, controlling the current AGV to execute the action to be executed;

the second action execution module is for, when the action to be executed is not a permitted action of the current AGV, calculating a valid action of the current AGV according to the evaluation indexes of the motion planning result output by the neural network model and the permitted action of the current AGV, and controlling the current AGV to execute the valid action.

13. The device according to claim 11, wherein the training unit comprises a model building module for building the neural network model using a fully connected neural network, and an input of the neural network model includes the state of current AGV, the states of other AGVs, and the permitted actions of the current AGV; wherein the permitted actions of the current AGV are input to a first single hidden layer fully connected neural network, the state of current AGV is input to a second single hidden layer fully connected neural network, the states of other AGVs are input to a long short-term memory network, and then to a third single hidden layer fully connected neural network, outputs of three single hidden layer fully connected neural networks are concatenated into a tensor, then input to a double hidden layer fully connected neural network, and the double hidden layer fully connected neural network outputs the evaluation indexes of the motion planning result; a dimension of the third single hidden layer fully connected neural network is greater than a dimension of the first single hidden layer fully connected neural network, and the dimension of the third single hidden layer fully connected neural network is greater than a dimension of the second single hidden layer fully connected neural network.

14. A multi-AGV motion planning system, comprising:
a multi-AGV motion planning device;
an AGV group composed of multiple AGVs and deployed in an environment; and
a task scheduling center platform provided with a display;
wherein the multi-AGV motion planning device comprises:
a processor which executes a program;
a modeling unit for establishing an object model for describing a sequence decision process of multi-AGV motion planning through a reinforcement learning method, wherein the object model includes: an AGV state obtained by a sensor of an AGV, an action space, and evaluation indexes of a motion planning result, and the AGV state includes a state of a current AGV, states of other AGVs calculated based on the state of the current AGV, and permitted actions of the current AGV;
a training unit for building a neural network model based on the object model, performing environment settings including AGV group deployment, and using the object model of the AGV in a set environment to train the neural network model until a stable neural network model is obtained;
a setting unit for setting an action constraint rule, and using the action constraint rule to perform validity judgment on an action to be executed by the current AGV obtained based on the evaluation indexes; and
an implementation unit for, after the motion planning is started, inputting the state of the current AGV, the states of other AGVs and the permitted actions in a current environment into the neural network model after training, obtaining the evaluation indexes of the motion planning result output by the neural network model, obtaining the action to be executed of the current AGV according to the evaluation indexes, and performing validity judgment on the action to be executed using the action constraint rule, and sending a judgment result to the current AGV and controlling the current AGV to execute a valid action;
the AGVs in the AGV group use their own sensors to obtain their own states and upload them to the multi-AGV motion planning device, and receive action instructions issued by the control center, and execute actions corresponding to the action instructions;
the task scheduling center platform is configured to complete task planning and task dispatch and send a task of a certain AGV to the multi-AGV motion planning device, and the multi-AGV motion planning device controls the AGV to complete the task;

the multi-AGV motion planning device has a built-in stable neural network model, inputs the state of the certain AGV received into the neural network model, uses the neural network model to calculate a motion planning strategy of the certain AGV, and then generates action instructions according to the motion planning strategy and issues them to the certain AGV, the state of current AGV includes: a speed of the current AGV in the body polar coordinate system, a target position, a size of current AGV, an average speed, and a road network distance between the current AGV and the target position;

the states of other AGVs include: relative positions of other AGVs in the body polar coordinate system of the current AGV, relative positions of targets of other AGVs in the body polar coordinate system of the current AGV, relative speeds of other AGVs in the body polar coordinate system of the current AGV, road network distances between other AGVs and their targets, sizes of other AGVs, a sum of the sizes of other AGVs and the size of current AGV, and road network distances between other AGVs and the current AGV, wherein the object model further includes: a reward for describing a reward given to the current AGV for taking an action, the reward includes at least three description types: a first description type which is a reward given when the current AGV reaches or approaches the target position, a second description type which is a penalty given when the current AGV collides with or approaches other AGVs, and a third description type which is a penalty given when the current AGV deviates from the road network;

wherein the first description type is set in the following way:

when the current AGV reaches the target position $p_g$, giving a positive maximum reward value $\alpha$; setting a first discount coefficient i based on a road network distance, calculating a positive discount reward value $i*\alpha$ and a negative discount reward value $-i*\alpha$ from the first discount coefficient i and the maximum reward value $\alpha$, and when the current AGV approaches the target position $p_g$, giving the positive discount reward value $i*\alpha$; when the current AGV is stationary or far away from the target position $p_g$, giving a negative discount reward value $-i*\alpha$;

the second description type is set in the following way:

when distances between the current AGV and other AGVs are less than a first threshold condition $t_{agv}$, giving a maximum penalty value $\beta$; setting a second discount coefficient i based on a distance, calculating a discount penalty value $j*\beta$ from the second discount coefficient j and the maximum penalty value $\beta$, and when distances between the current AGV and other AGVs are greater than the first threshold condition $t_{agv}$ and less than a second threshold condition $m*t_{agv}$, giving the discount penalty value $j*\beta$; and when the distances between the current AGV and other AGVs are greater than the second threshold condition $m*t_{agv}$, giving no penalty; m is a preset multiple;

the third description type is set in the following way:

when a distance between the current AGV and a current path is not less than a third threshold condition $t_m$, giving a penalty $\delta$; when the distance between the current AGV and the current path is less than the third threshold condition $t_m$, giving no penalty.

15. The device according to claim 14, wherein the implementation unit comprises a judgment module, a first action execution module, and a second action execution module;

the judgment module is for judging whether the action to be executed is a permitted action of the current AGV;

the first action execution module is for, when the action to be executed is a permitted action of the current AGV, controlling the current AGV to execute the action to be executed;

the second action execution module is for, when the action to be executed is not a permitted action of the current AGV, calculating a valid action of the current AGV according to the evaluation indexes of the motion planning result output by the neural network model and the permitted action of the current AGV, and controlling the current AGV to execute the valid action.

16. The system according to claim 14, wherein the training unit comprises a model building module for building the neural network model using a fully connected neural network, and an input of the neural network model includes the state of current AGV, the states of other AGVs, and the permitted actions of the current AGV; wherein the permitted actions of the current AGV are input to a first single hidden layer fully connected neural network, the state of current AGV is input to a second single hidden layer fully connected neural network, the states of other AGVs are input to a long short-term memory network, and then to a third single hidden layer fully connected neural network, outputs of three single hidden layer fully connected neural networks are concatenated into a tensor, then input to a double hidden layer fully connected neural network, and the double hidden layer fully connected neural network outputs the evaluation indexes of the motion planning result; a dimension of the third single hidden layer fully connected neural network is greater than a dimension of the first single hidden layer fully connected neural network, and the dimension of the third single hidden layer fully connected neural network is greater than a dimension of the second single hidden layer fully connected neural network.

* * * * *